United States Patent
Conte et al.

(10) Patent No.: US 8,924,743 B2
(45) Date of Patent: Dec. 30, 2014

(54) SECURING DATA CACHES THROUGH ENCRYPTION

(75) Inventors: Thomas Martin Conte, Atlanta, GA (US); Andrew Wolfe, Los Gatos, CA (US)

(73) Assignee: Empire Technology Development LLC, Wilmington, DE (US)

( * ) Notice: Subject to any disclaimer, the term of this patent is extended or adjusted under 35 U.S.C. 154(b) by 319 days.

(21) Appl. No.: 12/436,657

(22) Filed: May 6, 2009

(65) Prior Publication Data

US 2010/0287385 A1    Nov. 11, 2010

(51) Int. Cl.
*G06F 12/14*    (2006.01)
*G06F 12/08*    (2006.01)

(52) U.S. Cl.
CPC ........ *G06F 12/0866* (2013.01); *G06F 12/1408* (2013.01)
USPC ............ 713/193; 713/189; 713/190; 380/269

(58) Field of Classification Search
CPC .......................... G06F 12/1408; G06F 12/0866
USPC ................... 713/189, 190, 103, 193; 380/269
See application file for complete search history.

(56) References Cited

U.S. PATENT DOCUMENTS

| | | | |
|---|---|---|---|
| 4,780,905 | A | 10/1988 | Cruts et al. |
| 5,224,166 | A | 6/1993 | Hartman, Jr. |
| 5,386,471 | A | 1/1995 | Bianco |
| 6,249,866 | B1 | 6/2001 | Brundrett et al. |
| 6,832,314 | B1 | 12/2004 | Irvin |
| 6,896,669 | B2 | 5/2005 | Krautkramer |
| 6,948,033 | B2 | 9/2005 | Ninose et al. |
| 7,111,169 | B2 | 9/2006 | Ripley et al. |
| 7,181,572 | B2 | 2/2007 | Walmsley |
| 7,305,562 | B1 | 12/2007 | Bianco et al. |
| 7,337,328 | B2 | 2/2008 | Evans |

(Continued)

FOREIGN PATENT DOCUMENTS

| | | |
|---|---|---|
| KR | 10-2006-0102584 | 9/2006 |
| KR | 10-2009-0019402 A | 2/2009 |

(Continued)

OTHER PUBLICATIONS

Shannon, "A Mathematical Theory of Communication", Bell System Technical Journal, vol. 27, Jul., Oct. 1948, pp. 379-423, 623-656.

(Continued)

*Primary Examiner* — Yin-Chen Shaw
(74) *Attorney, Agent, or Firm* — Dorsey & Whitney LLP (57) ABSTRACT

Encryption techniques for securing data in a data cache are generally disclosed. Example methods may include one or more of reading the cache to identify data, determining whether the data is encrypted to identify previously unencrypted data and/or previously encrypted data, and encrypting selectively at least a portion of the previously unencrypted data. The present disclosure also generally relates to a computer system data processor configured to read a cache to identify data, determine whether the read data is encrypted, and encrypt selectively at least a portion of the previously unencrypted data. The present disclosure also generally relates to computer accessible mediums containing computer-executable instructions for data encryption upon execution of the instructions by a data processor. The instructions may configure the data processor to perform procedures that read the cache to identify data, determine whether the data is encrypted, and selectively encrypt data determined as unencrypted.

25 Claims, 8 Drawing Sheets

(56) References Cited

U.S. PATENT DOCUMENTS

| | | | |
|---|---|---|---|
| 7,434,255 B2 | 10/2008 | Akimoto | |
| 7,613,920 B2 | 11/2009 | Gustave et al. | |
| 7,627,756 B2 | 12/2009 | Fujibayashi et al. | |
| 7,647,452 B1* | 1/2010 | Moll et al. | 711/118 |
| 7,881,471 B2* | 2/2011 | Spohrer et al. | 380/257 |
| 8,181,047 B2* | 5/2012 | Lee | 713/320 |
| 8,213,607 B2* | 7/2012 | Rose et al. | 380/44 |
| 8,341,724 B1 | 12/2012 | Burns et al. | |
| 8,352,679 B2* | 1/2013 | Wolfe et al. | 711/118 |
| 2003/0005314 A1* | 1/2003 | Gammel et al. | 713/189 |
| 2003/0028699 A1* | 2/2003 | Holtzman et al. | 710/301 |
| 2003/0145329 A1* | 7/2003 | Candelore | 725/87 |
| 2003/0177386 A1* | 9/2003 | Cuomo et al. | 713/201 |
| 2004/0236884 A1* | 11/2004 | Beetz | 710/68 |
| 2006/0080553 A1 | 4/2006 | Hall | |
| 2006/0129811 A1 | 6/2006 | Fiske | |
| 2006/0195704 A1 | 8/2006 | Cochran et al. | |
| 2006/0230234 A1 | 10/2006 | Bentolila et al. | |
| 2007/0038858 A1 | 2/2007 | Hughes | |
| 2007/0055893 A1 | 3/2007 | Dodd | |
| 2007/0101124 A1 | 5/2007 | Pitts | |
| 2007/0116267 A1* | 5/2007 | Speirs et al. | 380/28 |
| 2007/0136606 A1* | 6/2007 | Mizuno | 713/189 |
| 2007/0180239 A1* | 8/2007 | Fujibayashi et al. | 713/165 |
| 2007/0245160 A1* | 10/2007 | Benhase et al. | 713/193 |
| 2008/0017712 A1 | 1/2008 | Hart et al. | |
| 2008/0040710 A1 | 2/2008 | Chiriac | |
| 2008/0208755 A1 | 8/2008 | Malcolm | |
| 2008/0229118 A1* | 9/2008 | Kasako et al. | 713/193 |
| 2008/0232592 A1* | 9/2008 | Lee et al. | 380/277 |
| 2009/0119242 A1 | 5/2009 | Vargas Martin | |
| 2009/0144546 A1 | 6/2009 | Jancula et al. | |
| 2010/0031062 A1 | 2/2010 | Nishihara et al. | |
| 2010/0042832 A1 | 2/2010 | Fujibayashi et al. | |
| 2010/0169683 A1* | 7/2010 | Wang et al. | 713/323 |
| 2010/0281223 A1 | 11/2010 | Wolfe et al. | |
| 2010/0281247 A1 | 11/2010 | Wolfe et al. | |
| 2010/0287383 A1 | 11/2010 | Conte et al. | |

FOREIGN PATENT DOCUMENTS

| | | |
|---|---|---|
| WO | 2008/044837 A1 | 4/2008 |
| WO | 2010/127008 | 11/2010 |
| WO | 2010/127030 | 11/2010 |

OTHER PUBLICATIONS

International Search Report for International Application No. PCT/US2010/032817 mailed on Dec. 10, 2010.

International Search Report for International Application No. PCT/US2010/032774 mailed on Dec. 20, 2010.

* cited by examiner

SECURING DATA CACHES THROUGH ENCRYPTION

CROSS REFERENCE TO RELATED APPLICATION

This application incorporates by reference related application Ser. No. 12/436,644, filed May 6, 2009, "Techniques for Detecting Encrypted Data" in its entirety.

BACKGROUND

Data stored and transmitted electronically may be vulnerable to theft. Data storage devices, such as hard drives, flash drives, compact disks, memory chips and the like, whether portable or built into a computing device, may be vulnerable to unauthorized remote access or the data being intercepted in transmission (i.e., "hacking") if linked to a network. Data storage devices may also be vulnerable to actual theft of the physical device. In 2006, for instance, a data storage device storing over 17 million cellular phone records was stolen from a cellular phone company employee; the device was recovered by police but concerns arose in 2008 that the data had been copied before it was recovered. Once stolen, data may be read by unauthorized users with relative ease unless precautions are taken.

One mitigation strategy that may be used is to store data in an encrypted format unreadable by unauthorized users. Such methods usually involve transforming the data with some sort of encryption algorithm, such as the advanced encryption standard (AES) announced by the National Institute of Standards and Technology (NIST). U.S. FIPS PUB 197 (FIPS 197). To read the encrypted data, a decryption key or algorithm may be used. Access to the decryption key or algorithm is typically limited to authorized users. Without the decryption key, unauthorized users generally are limited to "brute force" decryption techniques to decrypt the data. With a suitably sophisticated encryption algorithm, such as AES, the amount of computing power required to do so renders such attacks virtually impossible or impractical.

Stand-alone programs such as TrueCrypt, or built-in routines within operating systems such as the 'cypher' command in Microsoft Windows are available that may encrypt individual files or the entirety of the data stored on bulk storage devices such as hard drives, floppy disks, or flash drives, for example. Protocols such as secure sockets layer (SSL) are widely used to secure data transmissions over the internet, coordinating encryption algorithms and decryption keys so that a data receiver may decrypt the incoming data. One remaining vulnerability, however, involves data stored by a data processing device such as a server or desktop computer in data caches.

Data caching is a nearly ubiquitous technique used with modern data processing devices to improve overall performance. Data access from data storage devices may be relatively slow compared to the data processing speed of data processors in modern data processing devices, such as the central processing unit (CPU) of modern computing systems. The CPU may be left operating at less than full capacity, remaining idle for several chip cycles as it waits for data to be read from storage, causing overall computer performance to suffer. To overcome this, hardware and software designers store copies of often-accessed data otherwise stored on slower storage devices onto faster storage devices in which data is much more quickly retrieved and transmitted. One example of a data cache is a disk cache, in which frequently retrieved data from bulk storage devices such as hard drives or memory sticks may be copied by the CPU and stored in main memory (i.e., in random access memory (RAM)). Data may be accessed by the CPU much more quickly from main memory than from even the fastest storage devices. Quicker access to frequently used data thus greatly improves overall processing speeds.

Data stored in the disk cache may be accessed like any other data on bulk storage devices, and may be thus likewise vulnerable to theft. Moreover, data stored in the disk cache is a copy of the most frequently accessed data from bulk storage, which may be the most sensitive data stored on the storage device.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, separated, and designed in a wide variety of different configurations, all of which are explicitly and implicitly contemplated and made part of this disclosure.

This disclosure is drawn, inter alia, to methods, apparatus, computer programs and systems related to encrypting cache data. Examples provided herein thus may be used for providing security against reading of data in a disk cache by unauthorized users. In various examples, the method may be run continually. Continually may include running at regular intervals, or when predetermined processes occur. In various examples, hardware and software systems and methods are disclosed. There are various vehicles by which processes and/or systems and/or other technologies described herein may be effected (e.g., hardware, software, and/or firmware), and that the vehicle used in any given embodiment may vary within the context in which the processes and/or systems and/or other technologies are deployed.

Accordingly, systems and methods for cache encryption or decryption are provided. Several examples contemplated herein encrypt data only when the data has not previously been encrypted. Because the cache may be designed to speed up the operation of data processing devices and because encryption/decryption of stored data may slow data processor speed, limiting encryption to such times increases functionality of the cache and, hence, the processor. Data in the cache may be decrypted for data processing by an algorithm based at least in part on a decryption key. Data added to the cache may be encrypted, (or re-encrypted in the case of decrypted data) when it is recognized as unencrypted data by an encryption method as disclosed herein, such as a native encryption routine.

Various examples contemplated herein encrypt data in the cache only when the data has been analyzed and a decision to encrypt has been made. Such analysis may comprise determining whether the data was previously encrypted and thus may be in an encrypted state. The native encryption routine may further be used to encrypt or erase the cache when security credentials are compromised, such as, for example, when a computer has lost contact with a network (an indication that a data processor may have been stolen) or an authorized user is not using the computer. Authorized users may be identified by an identification process, such as radio frequency identification (RFID) cards, or a biometric security device such as thumbprint scans, for example. As is described more fully below, instructions may be loaded on a data processor or other computer system component for running encryption/decryption processes, routines, and methods as described herein.

Figure 1:
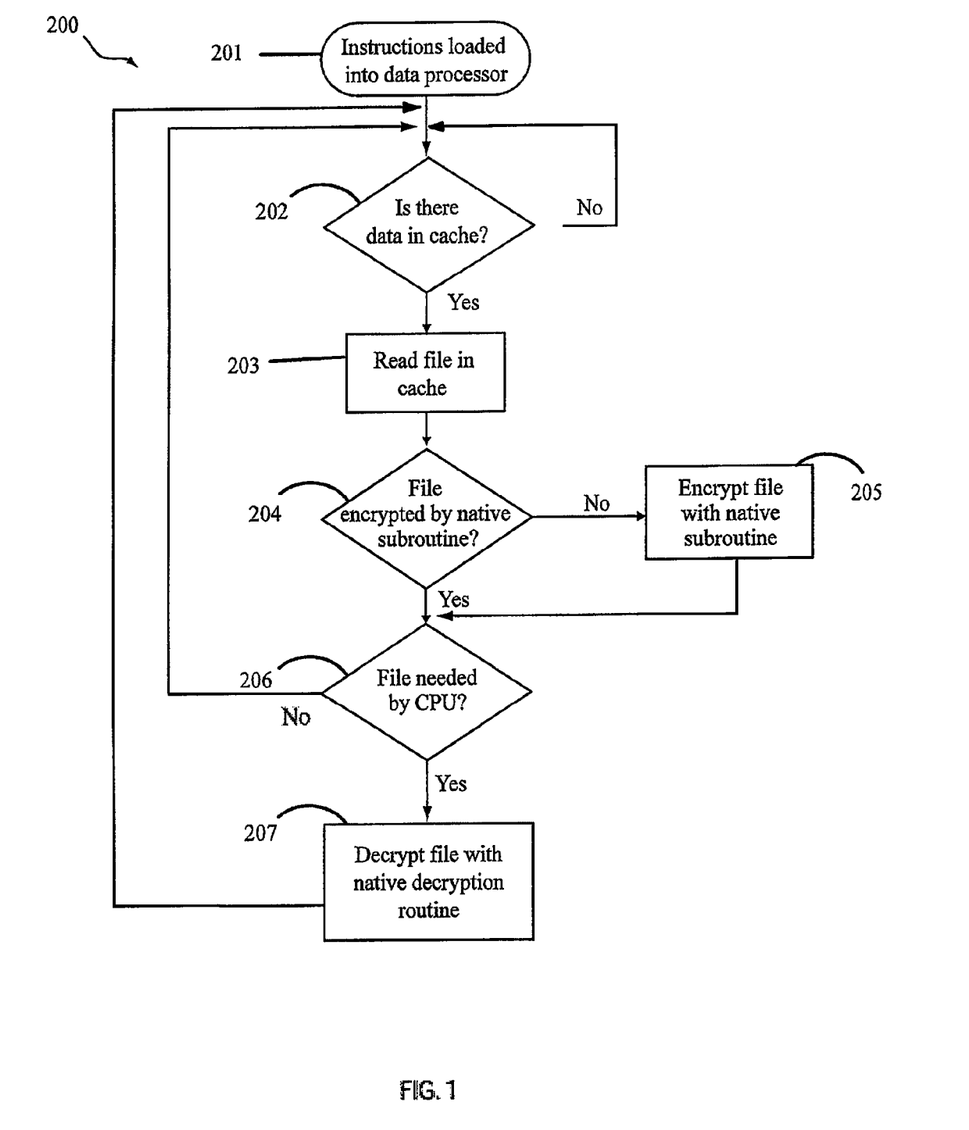
FIG. 1 is a flow chart depicting an example implementation of a cache encryption/decryption process.

FIG. 1 is a flow chart depicting an example implementation of a cache encryption/decryption process in accordance with the present disclosure. The process 200 begins once instructions are loaded into the data processor (block 201). Next, process 200 may detect whether there is data in the cache (block 202). The data may be an individual file or block of data (hereinafter referred to as a "file"). If not, the process may repeat until data is present in the cache. If there is data in the cache, the process may read the data in the cache (block 203). Next, the process may determine whether an individual file has been encrypted by a native subroutine (block 204). If the file has not been encrypted by a native subroutine, the process may encrypt the file using the native encryption routine (block 205). If the file has been encrypted by a native subroutine, the file may generally not be re-encrypted, thus avoiding encrypting it a second time. Next, the process 200 may check if the file is needed by the CPU (block 206). If the file is not needed by the CPU, the file may be left alone and the process may repeat, returning to monitoring the cache for data (such as unencrypted files) that have since been added to the cache by the CPU (blocks 202, 203). Returning to block 206, if the file is needed by the CPU, the file may be decrypted by the native decryption routine (block 207). The process may then return to monitoring the cache for data (such as unencrypted files) (blocks 202, 203). For the sake of clarity process 200 has been described as applied to a single file. It is to be appreciated that process 200 may be applied to multiple files or data substantially simultaneously. In some examples process 200 may be run on all files in the cache substantially simultaneously.

Figure 2:
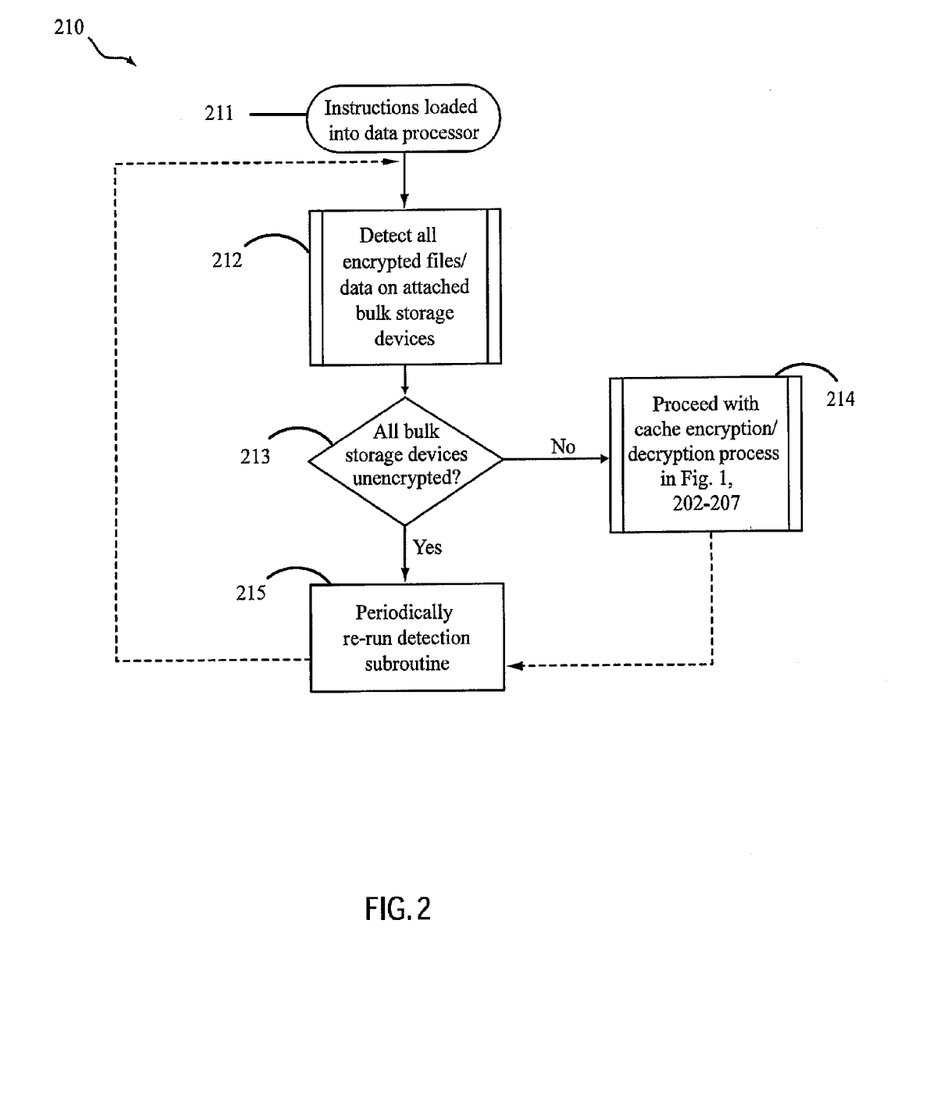
FIG. 2 is a flow chart depicting an example implementation of a process where low-security data may be detected automatically and cache encryption may be turned off.

FIG. 2 is a flow chart depicting an example implementation of a process where low-security data may be detected automatically and cache encryption may be turned off, in accordance with the present disclosure. Cache encryption may boost security but often may cause a reduction in processing speed. Where data in the cache is not particularly sensitive, a user may prefer increased processor speed to increased security. As shown in FIG. 2, the process 210 begins once instructions are loaded into the data processor (block 211). Next, as a way of discovering the security needs of the user, the process 210 may detect whether there are encrypted files or data on the attached bulk storage devices (block 212). While specific reference is made to detecting files on the attached bulk storage device, the process generally may detect any type of data including individual files, multiple files, or datablocks, for example. Files detected by the process may include files that may be directly attached to the data processor or attached through a network. In some examples, a subroutine may be initiated to detect encrypted files or data encrypted by bulk storage device protection processes, for example, McAfee® Total Protection for Data (block 212).

The process may next detect whether all bulk storage devices are unencrypted (block 213). In order to detect encrypted data encrypted by bulk storage device protection processes, a bulk storage device may report directly if it is encrypted. The Alternatively, an encryption detection method may be used to detect encrypted data encrypted by bulk storage device protection processes. One suitable encryption detection method is described in the concurrent patent application U.S. patent application Ser. No. 12/436,644, filed May 6, 2009, herein incorporated by reference in its entirety. For instance, in an embodiment of the encryption detection method referenced above, the method may involve first reading data from a data source, such as a bulk storage device. Next the encryption detection method may calculate a property of the data, such as Shannon entropy or compressibility, and compare the calculated value with a threshold entropy or compressibility value that indicates that the data are encrypted. An additional sorting mechanism may be performed prior to the calculation step, in which, if data are stored in a file structure, data files of types known to be encrypted may be indicated as such without further processing.

The presence of any or some (various thresholds are possible) encrypted files on bulk storage may serve as an indicator for a need for higher data security. Where higher data security is warranted, the process 210 may proceed to encrypt unencrypted files using the cache encryption/decryption process steps shown in FIG. 1, blocks 202-207 (block 214). The detection of encryption in bulk storage devices (block 212) may be periodically re-run. If all data on bulk storage becomes unencrypted, the cache encryption/decryption process steps shown at FIG. 1, blocks 202-207 may be stopped. Similarly, whenever encrypted data is detected on attached bulk storage devices, the cache encryption/decryption process steps shown in FIG. 1, blocks 202-207 may restart (as indicated in block 214).

Figure 3:
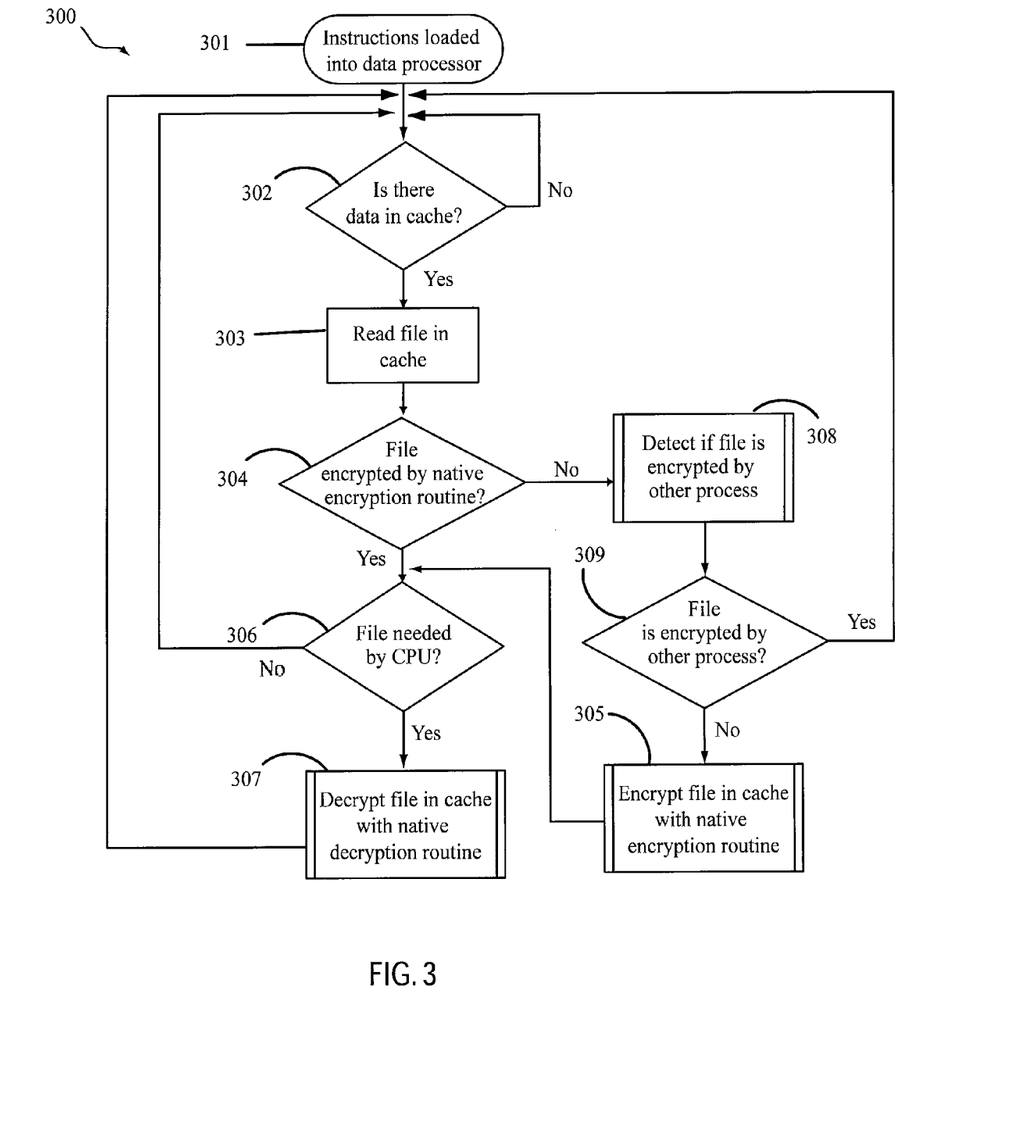
FIG. 3 is a flow chart depicting an example implementation of a process in which encryption is limited to individual files in the cache that have not been already previously encrypted, such as by bulk storage device data encryption programs

FIG. 3 is a flow chart depicting an example implementation of a process in which encryption is limited to individual files in the disk cache that have not been already previously encrypted, such as by bulk storage device data encryption programs, in accordance with the present disclosure. Refraining from encrypting in the cache files that have already been encrypted by other processes generally improves overall computer efficiency, since the files are not double-encrypted. This is generally not perceived as a security risk because, once encrypted, the file has enhanced security and thus security may not be appreciably increased by double encryption. The process 300 begins once instructions are loaded into the data processor (block 301). Next, the process may detect whether there is data in the cache (block 302). The cached data may be an individual file, files or block of data (hereinafter "file"). If there is not data in the cache, the process 300 may repeat until data is present in the cache. If there is data in the cache, the process 300 may read the file in the cache (block 303). Next, the process 300 may determine whether the file has been encrypted by the native encryption routine as described herein (block 304). If the file has been encrypted by the native encryption routine, the process 300 may determine if the file in the cache is needed by the CPU (block 306). If the file is needed by the CPU, then the process 300 may decrypt the file, for example using the native decryption routine (block 307). Further, files needed by the CPU that are decrypted by other processes may be also decrypted with their appropriate decryption routines at this time. Regardless of whether the file is needed by the CPU, the process 300 may return to monitoring the cache (blocks 302, 303).

Alternatively, returning to block 304, if the file has not already been encrypted by a native encryption subroutine, the process 300 may detect if a file has been encrypted by another process (block 308). If the file has not been encrypted by another process, as determined in block 309, then the file in the cache may be encrypted (block 305). If the file has been encrypted by another process, as determined in block 309, then the file in the cache may not be re-encrypted. This avoids double-encrypting such files. The process 300 may then return to monitoring the cache for data (blocks 302, 303). For the sake of clarity, the process 300 has been described as applied to a single file. It is to be appreciated that the process 300 may be applied to multiple files substantially simultaneously. In some examples the process 300 may be run on all files in the cache substantially simultaneously.

Figure 4:
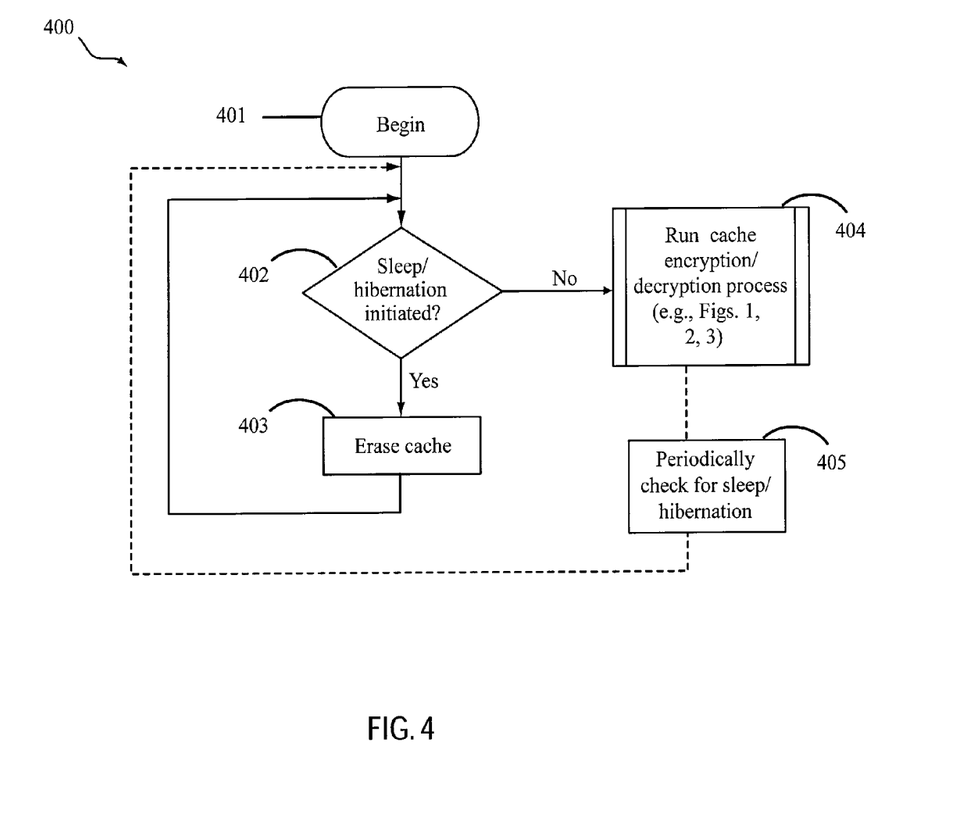
FIG. 4 is a flow chart depicting an example implementation of a process in which the cache is automatically erased if the CPU initiates a sleep/hibernation mode.

FIG. 4 is a flow chart depicting an example implementation of a process in which the cache may automatically be erased when the CPU initiates a sleep/hibernation mode, in accordance with the present disclosure. The described additional cache data security measures may be added to any of the processes described with respect to FIGS. 1, 2, and 3. In some examples, the cache may be erased when the data processing device enters into a sleep or hibernation mode. The process 400 may begins at block 401. In general, the process 400 may begin once instructions are loaded into the data processor. The process 400 may determine whether the data processor has initiated a sleep or hibernation mode (block 402). If a sleep or hibernation mode has been initiated, the cache may be erased (block 403). If a sleep or hibernation mode has been not been initiated, and thus the data processing device is still in active mode, cache encryption/decryption processes such as depicted in FIGS. 1, 2, and 3 may be run (block 404). The process 400 may periodically re-run to maintain cache security (block 405) by checking for changes in the operating mode of the processor from active to sleep/hibernation or vice-versa. Other examples contemplate other security measures that may be adopted alone or in combination with erasing the cache, such as erasing files in the cache that have not been recently used, keep assessing whether an authorized user is using the data processing device such as by using identification methods such as radio frequency identification (RFID) cards, or biometric security device such as thumbprint scans. Thus, if the cache contains files that have not recently updated, or an unauthorized user is using the device, the cache may be fully or partially erased. In some examples, the cache may be erased and/or encrypted.

Figure 5:
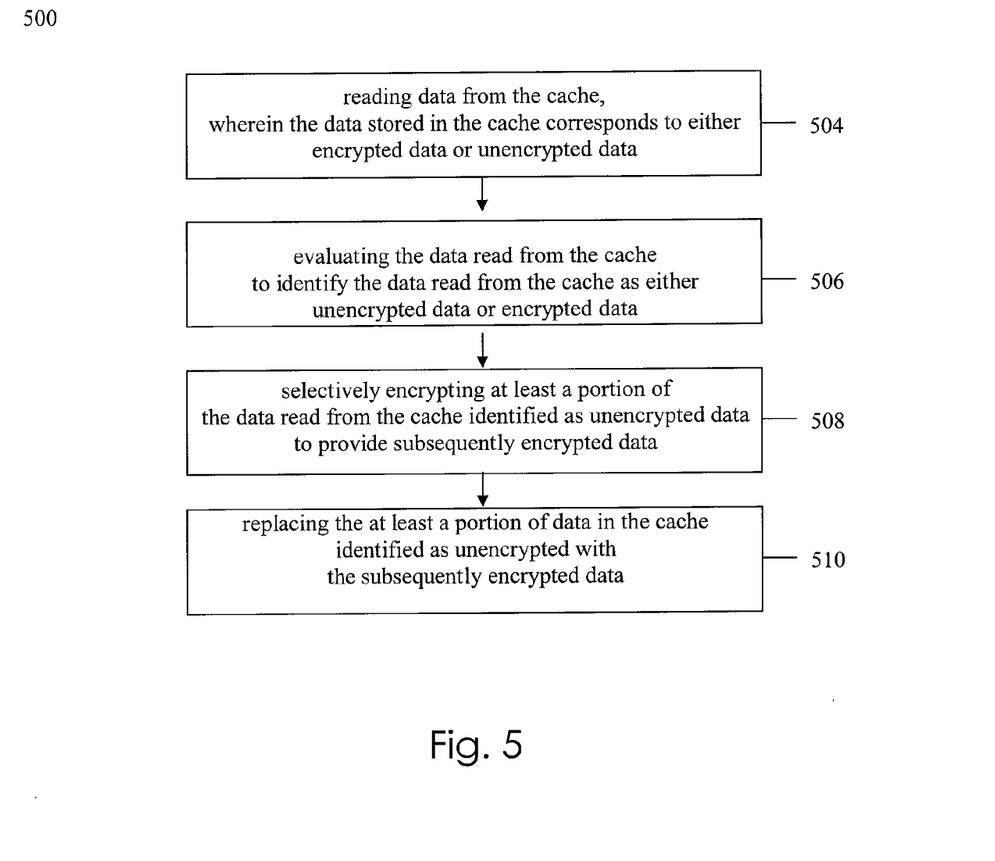
FIG. 5 is a flow chart illustrating an example implementation of a process for performing in-memory encryption of data stored in a cache.

FIG. 5 illustrates a flow diagram of an illustrative example of a process 500 for encryption of data stored in a cache, in accordance with the present disclosure. The process 500 may correspond to the examples of the present disclosure shown in FIG. 1, blocks 202-205 (as well as FIG. 2, block 214 and FIG. 4, block 404), and FIG. 3, blocks 303-307. The process 500 may include reading the cache to identify data (block 504). The process 500 then may include determining whether the data read from the cache is encrypted to identify one or more of previously unencrypted data and previously encrypted data using a data processing device (block 506). The process 500 then may include encrypting selectively data determined as being unencrypted (block 508).

Figure 6:
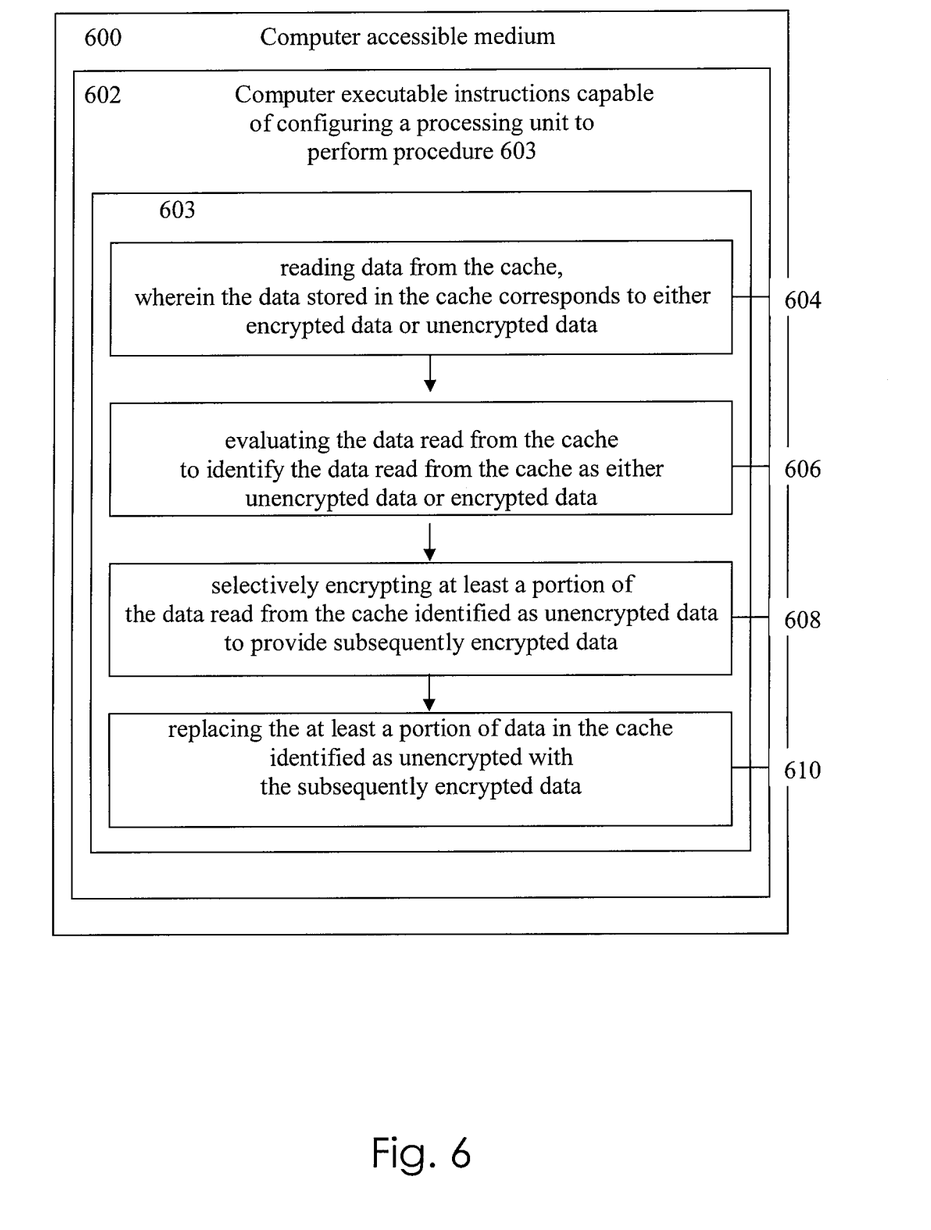
FIG. 6 is a schematic diagram illustrating an example system for performing a process of cache encryption/decryption.

FIG. 6 is a schematic diagram illustrating an example system for performing a process 603 of cache encryption/decryption, in accordance with the present disclosure. The procedure 603 listed in blocks 604-608 may correspond to the example embodiments of the present disclosure shown in FIG. 1, blocks 202-205 (as well as FIG. 2, block 214 and FIG. 4, block 404), and FIG. 3, blocks 303-307. As shown in FIG. 6, a computer accessible medium 600 is provided having stored thereon computer executable instructions 602 for performing an example process 603 for data encryption. The computer executable instructions may be capable of configuring a processing unit to perform the example procedure 603. In block 604, the procedure 603 may include reading the cache to identify data. In block 606, procedure 603 may include determining whether the data read from the cache is encrypted to identify one or more of previously unencrypted data and previously encrypted data. In block 608, procedure 603 may include encrypting selectively data determined as being unencrypted.

Figure 7:
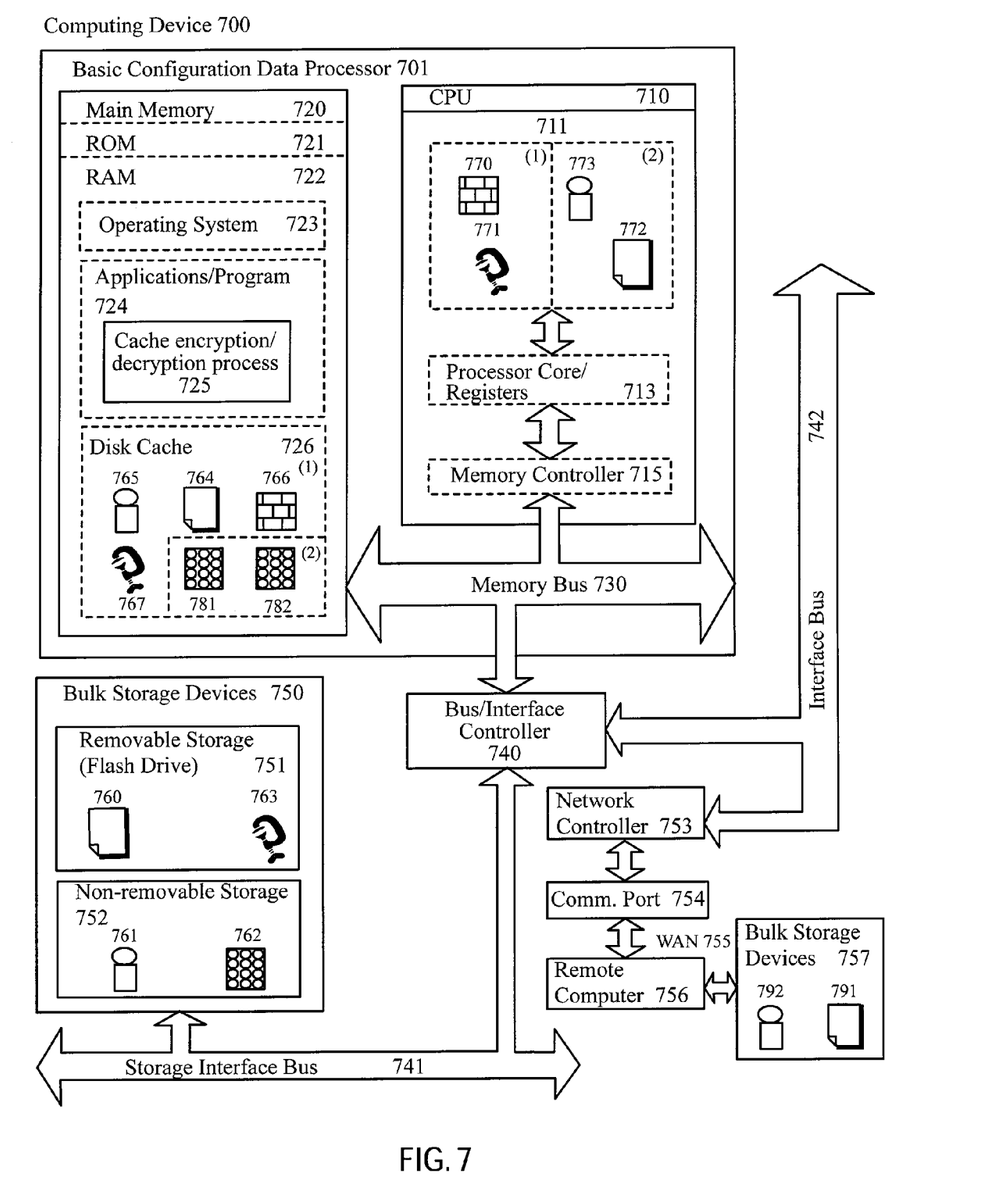
FIG. 7 is a schematic diagram of an illustrative computing device that is arranged for performing one or more example processes for cache encryption/decryption.

FIG. 7 is a schematic diagram of an illustrative computing device that is arranged for performing cache encryption/decryption processes in accordance with the present disclosure. The computing device 700 may include a basic configuration data processor 701. The data processor 701 may include the CPU 710, in which is included: a CPU cache 711, may be used to temporarily store frequently accessed data (often from main memory 720) to speed data processing operations, the processor and core registers 713, and a memory controller 715. Main memory 720 may contain read only memory (ROM) 721 and/or RAM 722. Stored in RAM 722 may be a computer operating system 723, as well as application and/or program data 724. In this example system, the cache encryption/decryption instructions 725 may be stored in 724. Also stored in RAM 722 may be a disk cache 726.

Main memory 720 and the CPU 710 may communicate via a memory bus 730. The basic configuration data processor 701 may communicate with external components via a bus/interface controller 740. The bus/interface controller 740 may further communicate to external components either via a storage interface bus 741 or an interface bus 742. The storage interface bus 741 may communicate with bulk storage devices 750. Bulk storage devices 750 may include, in some examples, removable storage, 751 such as a flash drive, and/or non-removable storage 752 such as a hard disk drive (HDD). The interface bus 742 may communicate with other external peripherals such as a network controller 753, a monitor, a printer, a pointing device, etc. (not shown here for clarity). The network controller 753 may allow computing device 700 to communicate, through one or more communications ports 754 and, here, for example, a wide area network (WAN) 755, with a remote computing device (such as a server) 756. Attached to the remote computing device 756 may be a remote bulk storage drive 757.

A cache encryption/decryption process 725, which may, for example, be the process 200 shown in FIG. 1, may begin with the cache encryption/decryption instructions 725 being read into the CPU 710. The process 725 may monitor a cache, here the disk cache 726, for unencrypted data. The disk cache 726 may store copies of data files stored in bulk storage devices 750, which would otherwise be directly accessed by CPU directly from the bulk storage device, slowing down overall data processor performance. For this example, these cached data files may include a text file 760, stored on a removable flash drive 751, and a picture file 761 and encrypted file 762 stored in the non-removable hard disk 752. The CPU 710 may perform frequent operations on these data file (for example, these data files may be actively being edited by the user) so CPU 710 may copy files 760, 761, 762 into the disk cache 726. The copied files, 765, 766, 767, are shown in the disk cache 726 at state (1).

Continuing the description of the example system configured to run, for example, the cache encryption/decryption process 725 (which, as stated above, may be process 200, outlined in FIG. 1), loaded into RAM 722 and run by the CPU or other suitable device, may read the disk cache contents, 726 state (1), and may recognize that file 766 is already encrypted by another process. Unencrypted files 764 and 765 may be encrypted by the CPU 710 running the disk encryption/decryption process 725. This is shown on the diagram as files 764 and 765 are changed into encrypted files 772 and 773, and temporarily stored in the CPU cache 711 state (1), during the encryption process. The encrypted files may replace the unencrypted files in the disk cache 726 state (2), so that the disk cache 726 contents are now two natively encrypted files 781 and 782, as well as file 783, which was encrypted by another process.

Next, the natively encrypted files 781 and 782 may be requested by the CPU 710, for use in some other process. Files 781 and 782 may be sent to the CPU 710, where they may be decrypted by the disk encryption/decryption process 725 and temporarily stored in the CPU cache 711 state (2), as files 774 and 775, as they may be decrypted and used by the CPU 710.

Alternatively, the cache encryption/decryption process 200 may use data files, 791, 792, whose ultimate source may be a remote network storage drive 757, encrypting and decrypting copies of 791 and 792 stored in the disk cache 726 of the computing device 700.

Accordingly, in some examples, a cache encryption/decryption process may be loaded into main memory (RAM) by software, or by other means such as a flash chip. Once loaded in memory, the encryption/decryption process may, in some examples, run continuously as a background process while the data processor is running and restart automatically after a CPU sleep/hibernation event or after a restart or when the data processing device is next turned on. Alternatively, an authorized user with administration privileges (that is, authorized to change security settings) could turn off or turn on the disk cache encryption/decryption process as needed. Further, the cache encryption/decryption process may be designed to run periodically.

Once a determination to encrypt data has been made (described more fully below), any suitable method for encrypting the data may be used. The actual native encryption routine used to encrypt the data in the disk cache may be the AES. Such data may be readily decrypted by the cache encryption/decryption process. Further, data that the process has already encrypted may be readily recognized so that it is not encrypted a second time.

Figure 8:
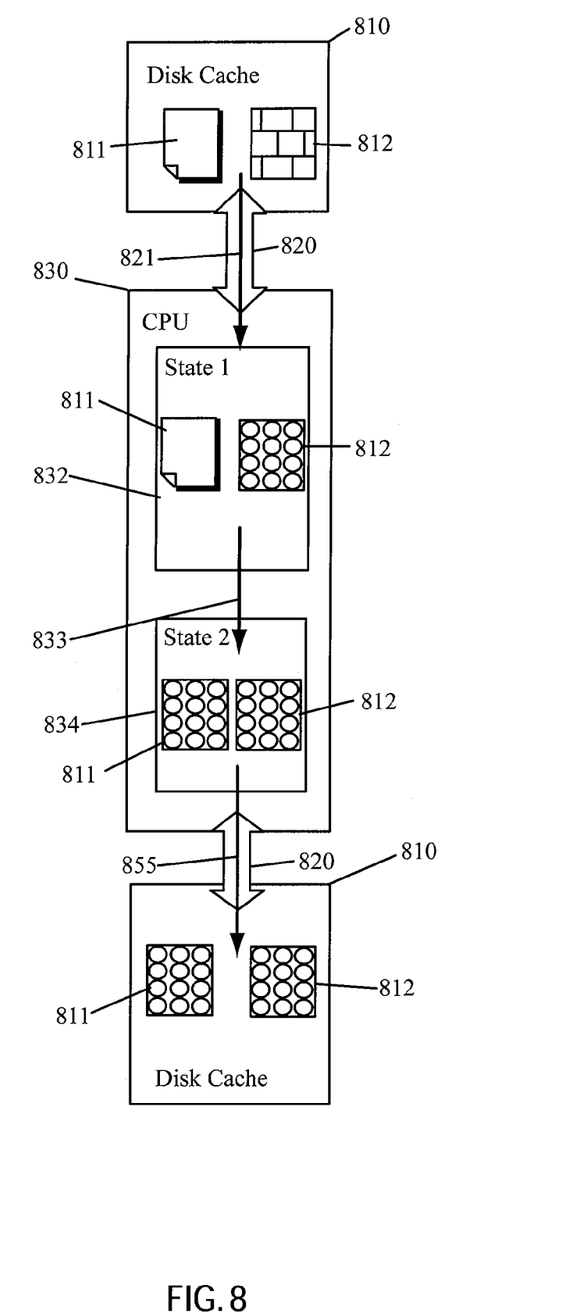
FIG. 8 is a block diagram illustrating an example cache encryption process in a disk cache and a CPU, all arranged in accordance with at least some embodiments of the present disclosure.

FIG. 8 is a block diagram illustrating an example cache encryption process in a disk cache and a CPU. In the example shown, two data files, an unencrypted text file 811 and a previously encrypted file 812 are stored in a disk cache 810 in a computing system. The disk cache 810 may communicate via a memory bus 820 with the CPU 830. The CPU 830 may read (arrow 821) the files 811, 812 into the CPU 830 through the memory bus 820. Next, the CPU 830 may determine whether the unencrypted text file 811 and already encrypted file 812 are encrypted at CPU state 1, shown in block 832. Next the CPU 830 may selectively encrypt the files (arrow 833), for example encrypting only the unencrypted text file. Block 84 shows CPU state 2, where in this example the unencrypted text file 811 may be encrypted, and the already encrypted file 812 may be left alone. The encrypted files 811 and 812 may then be written, as indicated by arrow 855, through the memory bus 820 and back into the disk cache 810.

The foregoing describes various examples of cache data encryption. Following are specific examples of methods and systems of cache data encryption. These are for illustration only and are not intended to be limiting. The present disclosure generally relates to a method for securing data in a cache in main memory in a data processing device. The described methods typically include reading the cache to identify data, determining whether the data is encrypted, and selectively encrypting data determined as being unencrypted.

In some further described methods, the method may include determining whether the data in the cache is encrypted by determining whether the data was encrypted by a native encryption routine. Some described methods may also determine whether data in the cache is encrypted by determining whether the data is encrypted on a bulk storage device. In some described examples, data encrypted on a bulk storage device may be decrypted. In some described examples, the method may also detect a sleep/hibernation sequence, and if such sequence is detected, erase the data in the cache. The described methods may only erase data determined to be encrypted if a sleep/hibernation sequence is detected. Some described methods may detect if a user's security credentials are compromised, and erase the data in the cache if a user's security credentials are compromised. The described methods may only erase data determined to be encrypted if a user's security credentials are compromised. In some of the described examples, the method may also identify data in the cache that has not been used for a predetermined length of time and erase such identified data. Some described examples may decrypt the encrypted data in response to a request from the central processing unit. In some described examples, the method may be run continually.

The present disclosure also generally relates to a computer system with at least one cache and a data processor configured to perform a procedure to process the data encryption of the cache. The described procedure may read the cache to identify data, determine whether the data is encrypted, and selectively encrypt data determined as being unencrypted.

In some example computing systems, determining whether the data in the cache is encrypted includes determining whether the data was encrypted by a native encryption routine. In some described examples, the system may also determine whether data in the cache is encrypted by determining whether the data is encrypted on a bulk storage device. In some examples systems, data encrypted on a bulk storage device may be decrypted. In some example systems, a sleep/ hibernation sequence may also be detected, and if such a sequence is detected, the data in the cache is erased. In some examples, the system may only erase data determined to be encrypted if a sleep/hibernation sequence is detected. In some described examples, the system may detect if a user's security credentials are compromised, and erase the data in the cache if a user's security credentials are compromised. In some described examples, the system may only erase data determined to be encrypted if a user's security credentials are compromised. In some examples, the computing system may identify data in the cache that has not been used for a predetermined length of time and erase such identified data.

The present disclosure also generally relates to computer-accessible mediums having stored thereon computer-executable instructions for cache encryption and decryption when the executable instructions are executed by a processing unit. The described instructions may configure the processing unit to perform procedures that read the cache to identify data, determine whether the data is encrypted, and selectively encrypt data determined as being unencrypted.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or coupled with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for selective data protection and encryption of a cache on a data processing device by using a data processor, comprising:
   reading data from the cache, using the data processor, wherein the data comprises copies of data stored in at least one other storage device;
   determining, using the data processor, whether the data read from the cache is encrypted to identify one or more of previously unencrypted data and previously encrypted data, wherein the previously unencrypted data comprises copies of data stored unencrypted in the at least one other storage device, wherein determining whether the data read from the cache is encrypted includes calculating at least one of a Shannon entropy value or a compressibility value, and comparing the calculated Shannon entropy value or compressibility value to a threshold entropy value or a threshold compressibility value, respectively;
   in response to identifying the data read from the cache as the previously unencrypted data, encrypting, using the data processor, selectively at least a portion of the previously unencrypted data to provide selectively encrypted data;
   in response to identifying the data read from the cache as the previously encrypted data, providing the previously encrypted data in the cache without further encryption;
   storing, using the data processor, the selectively encrypted data in the cache;
   erasing at least a portion of the data read from the cache in response to detection of security credentials being compromised; and
   detecting a sleep/hibernation sequence, and erasing at least a portion of the data read from the cache in response to detecting the sleep/hibernation sequence.

2. The method of claim 1, wherein determining whether the data read from the cache is encrypted further comprises determining whether the previously encrypted data was encrypted by a native encryption routine.

3. The method of claim 1, wherein determining whether the data read from the cache is encrypted further comprises determining whether the previously encrypted data was encrypted on a bulk storage device.

4. The method of claim 3, further comprising decrypting at least a portion of the previously encrypted data that was encrypted on the bulk storage device.

5. The method of claim 1, wherein erasing at least the portion of the data read from the cache in response to detection of the sleep/hibernation sequence comprises erasing at least a portion of the data determined to be encrypted while preserving at least some of the data determined to be unencrypted.

6. The method of claim 1, wherein erasing at least the portion of the data in the cache in response to detection of the security credentials being compromised comprises erasing at least a portion of the data determined to be encrypted while preserving at least some of the data determined to be unencrypted in response to detection of the security credentials being compromised.

7. The method of claim 1, further comprising identifying data in the cache that has not been used for a particular length of time and erasing such identified data.

8. The method of claim 1, further comprising decrypting the previously encrypted data using the data processor in response to a request by the data processing device.

9. The method of claim 1, wherein the method is run continually.

10. A computing system, comprising:
    a cache; and
    a data processor configured to:
    read data from the cache, wherein the data comprises copies of data stored in at least one other storage device;
    determine whether the data read from the cache is encrypted to identify one or more of previously unencrypted data and previously encrypted data, wherein the previously unencrypted data comprises copies of data stored unencrypted in the at least one other storage device, wherein to determine whether the data read from the cache is encrypted, the data processor is configured to calculate at least one of a Shannon entropy value or a compressibility value, and to compare the calculated Shannon entropy value or compressibility value to a threshold entropy value or a threshold compressibility value, respectively;
    in response to identification of the data read from the cache as the previously unencrypted data, encrypt selectively at least a portion of the previously unencrypted data to provide selectively encrypted data;
    in response to identification of the data read from the cache as the previously encrypted data, provide the previously encrypted data in the cache without further encryption;
    store the selectively encrypted data in the cache;

detect a sleep/hibernation sequence, and erase at least a portion of the data read from the cache in response to detection of the sleep/hibernation sequence; and erase at least a portion of the data read from the cache in response to detection of security credentials being compromised.

11. The computing system of claim 10, wherein the data processor is further configured to determine whether the previously encrypted data was encrypted by a native encryption routine.

12. The computing system of claim 10, wherein the data processor is further configured to determine whether the previously encrypted data was encrypted on a bulk storage device.

13. The computing system of claim 12, wherein the data processor is further configured to decrypt at least a portion of the previously encrypted data that was determined to be encrypted on the bulk storage device.

14. The computing system of claim 10, wherein the data processor is configured to erase at least the portion of the data read from the cache determined to be encrypted while at least some of the data determined to be unencrypted is preserved, in response to the detection of the sleep/hibernation sequence.

15. The computing system of claim 10, wherein the data processor is configured to erase at least the portion of the data determined to be encrypted while at least some of the data determined to be unencrypted is preserved, in response to the detection of the security credentials being compromised.

16. The computing system of claim 10, wherein the data processor is further configured to identify data in the cache that has not been used for a particular length of time and erase such identified data.

17. A non-transitory computer accessible medium that includes computer executable instructions stored thereon for cache encryption and decryption in response to execution of the executable instructions by a processor unit, the computer executable instructions capable to configure the processor unit to perform a procedure, comprising:

reading data from the cache, wherein the data comprises copies of data stored in at least one other storage device;

determining whether the data read from the cache is encrypted to identify one or more of previously unencrypted data and previously encrypted data, wherein the previously unencrypted data comprises copies of data stored unencrypted in the at least one other storage device and wherein determining whether the data read from the cache is encrypted includes performing entropy analysis on the data read from the cache;

in response to identifying the data read from the cache as the previously unencrypted data, encrypting at least a portion of the previously unencrypted data to provide selectively encrypted data;

in response to identifying the data read from the cache as the previously encrypted data, providing the previously encrypted data in the cache without further encryption;

storing the selectively encrypted data in the cache, wherein determining whether the data read from the cache is encrypted, including performing the entropy analysis on the data read from the cache, includes:

examining each file of data read from the cache to identify header information indicating that the respective file is either compressed or uncompressed;

identifying each file as either compressed or uncompressed based on the examination of the header information;

in response to each file being identified as uncompressed, performing the entropy analysis on the data read from the cache corresponding to each file that is identified as uncompressed, wherein the entropy analysis includes calculating a Shannon entropy value and comparing the calculated Shannon entropy value to a threshold entropy value; and determining based on the entropy analysis whether the data read from the cache corresponding to each file is previously encrypted data;

erasing at least a portion of the data read from the cache in response to detection of security credentials being compromised; and detecting a sleep/hibernation sequence, and erasing at least a portion of the data read from the cache in response to detecting the sleep/hibernation sequence.

18. The computer accessible medium of claim 17, wherein determining whether the data read from the cache is encrypted further comprises determining whether the previously encrypted data was encrypted by a native encryption routine.

19. The method of claim 1, wherein the storing, using the data processor, the selectively encrypted data in the cache comprises replacing the at least the portion of the previously unencrypted data with the selectively encrypted data.

20. The system of claim 10, wherein to store the selectively encrypted data, the data processor is configured to replace the at least the portion of the previously unencrypted data with the selectively encrypted data.

21. The non-transitory computer accessible medium of claim 17, wherein the storing the selectively encrypted data in the cache comprises replacing the at least the portion of the previously unencrypted data with the selectively encrypted data.

22. The method of claim 1, wherein the security credentials are contained in a signal provided by a radio frequency identification card.

23. The method of claim 1, wherein detection of the security credentials being compromised includes determination of whether the data processing device has lost contact with a network.

24. The method of claim 1, wherein the data read from the cache is determined to be encrypted when the Shannon entropy value is above the threshold entropy value.

25. The method of claim 1, wherein the data read from the cache is determined to be encrypted when the compressibility value is above the threshold compressibility value.

* * * * *

UNITED STATES PATENT AND TRADEMARK OFFICE
CERTIFICATE OF CORRECTION

PATENT NO. : 8,924,743 B2
APPLICATION NO. : 12/436657
DATED : December 30, 2014
INVENTOR(S) : Conte et al.

It is certified that error appears in the above-identified patent and that said Letters Patent is hereby corrected as shown below:

In The Specification

In Column 2, Line 33, delete "programs" and insert -- programs; --, therefor.

In Column 9, Line 44, delete "and or" and insert -- and/or --, therefor.

In The Claims

In Column 13, Line 46, in Claim 17, delete "device and" and insert -- device; and --, therefor.

In Column 14, Line 26, in Claim 18, delete "computer" and insert -- non-transitory computer --, therefor.

Signed and Sealed this
Twenty-third Day of June, 2015

Michelle K. Lee
*Director of the United States Patent and Trademark Office*